United States Patent
Yue et al.

(10) Patent No.: US 8,432,406 B1
(45) Date of Patent: Apr. 30, 2013

(54) APPARATUS, SYSTEM, AND METHOD FOR CLIPPING GRAPHICS PRIMITIVES WITH ACCELERATED CONTEXT SWITCHING

(75) Inventors: Lordson L. Yue, Foster City, CA (US); Vimal S. Parikh, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 761 days.

(21) Appl. No.: 12/182,588

(22) Filed: Jul. 30, 2008

Related U.S. Application Data

(63) Continuation of application No. 11/313,085, filed on Dec. 19, 2005, now Pat. No. 7,420,572.

(51) Int. Cl.
*G06T 1/20* (2006.01)

(52) U.S. Cl.
USPC ........... 345/506; 345/501; 345/418; 345/427; 345/582; 345/619; 718/108

(58) Field of Classification Search .......... 345/619–620, 345/582, 419–427, 501–506
See application file for complete search history.

(56) References Cited

U.S. PATENT DOCUMENTS

| | | | |
|---|---|---|---|
| 3,889,107 A | 6/1975 | Sutherland | |
| 4,958,305 A | 9/1990 | Piazza | |
| 5,051,737 A | 9/1991 | Akeley et al. | |
| 5,224,210 A | 6/1993 | Pinedo et al. | |
| 5,420,980 A | 5/1995 | Pinedo et al. | |
| 5,428,779 A * | 6/1995 | Allegrucci et al. | 718/108 |
| 5,444,838 A | 8/1995 | Kommrusch et al. | |
| 5,455,958 A | 10/1995 | Flurry et al. | |
| 5,564,009 A | 10/1996 | Pinedo et al. | |
| 5,572,657 A | 11/1996 | Pinedo et al. | |
| 5,613,052 A | 3/1997 | Narayanaswami | |
| 5,720,019 A | 2/1998 | Koss et al. | |
| 5,838,331 A | 11/1998 | DeBry | |
| 5,877,773 A | 3/1999 | Rossin et al. | |
| 5,949,421 A | 9/1999 | Ogletree et al. | |
| 5,986,669 A | 11/1999 | Kirkland | |
| 6,052,129 A | 4/2000 | Fowler et al. | |
| 6,061,066 A | 5/2000 | Priem | |
| 6,137,497 A | 10/2000 | Strunk et al. | |
| 6,181,352 B1 | 1/2001 | Kirk et al. | |
| 6,208,361 B1 | 3/2001 | Gossett | |
| 6,359,630 B1 | 3/2002 | Morse et al. | |
| 6,459,438 B1 | 10/2002 | Mang | |

(Continued)

OTHER PUBLICATIONS

U.S. Appl. No. 11/195,389, filed Aug. 2, 2005, Moreton et al.

(Continued)

*Primary Examiner* — Jin-Cheng Wang
(74) *Attorney, Agent, or Firm* — Cooley LLP

(57) ABSTRACT

An apparatus, system, and method for clipping graphics primitives are described. In one embodiment, a graphics processing apparatus includes a clipping unit that is configured to produce and issue $n_i$ initial outputs based on execution of a set of clipping operations, wherein $n_i$ represents the number of the initial outputs that are issued by the clipping unit prior to context switching, and the initial outputs partially define a clipped graphics primitive. The graphics processing apparatus also includes a control unit connected to the clipping unit. The control unit is configured to preserve an initial execution state of the clipping unit in response to an initial command for context switching, wherein the initial execution state is preserved based on $n_i$.

20 Claims, 4 Drawing Sheets

U.S. PATENT DOCUMENTS

| | | | |
|---|---|---|---|
| 6,507,348 B1 | 1/2003 | Mang et al. | |
| 6,512,524 B1 | 1/2003 | Mang | |
| 6,552,723 B1 | 4/2003 | Duluk, Jr. et al. | |
| 6,567,084 B1 | 5/2003 | Mang et al. | |
| 6,577,305 B1 | 6/2003 | Duluk, Jr. | |
| 6,597,363 B1 | 7/2003 | Duluk et al. | |
| 6,621,495 B1 * | 9/2003 | Cook et al. | 345/506 |
| 6,686,924 B1 | 2/2004 | Mang et al. | |
| 6,774,895 B1 | 8/2004 | Papakipos et al. | |
| 6,782,432 B1 | 8/2004 | Nelson et al. | |
| 6,928,646 B1 | 8/2005 | James et al. | |
| 7,088,359 B2 | 8/2006 | Huang et al. | |
| 7,292,242 B1 | 11/2007 | Wittenbrink et al. | |
| 7,292,254 B1 | 11/2007 | Yue et al. | |
| 7,315,310 B2 | 1/2008 | Sakamoto et al. | |
| 7,400,325 B1 | 7/2008 | Gimby et al. | |
| 7,439,988 B1 | 10/2008 | Parikh et al. | |
| 7,466,322 B1 | 12/2008 | Moreton et al. | |
| 2003/0095137 A1 | 5/2003 | Lu et al. | |

OTHER PUBLICATIONS

Yue, et al., U.S. Appl. No. 11/313,085 filed Dec. 19, 2005 for "Apparatus, System, and Method for Clipping Graphics Primitives With Accelerated Context Switching." Office Actions mailed Feb. 21, 2007, Jun. 21, 2007, Nov. 26, 2007, Notice of Allowance mailed May 1, 2008.

* cited by examiner

| Timeline | Outputs Produced | Outputs Issued | Number of Outputs Produced | Number of Outputs Issued |
|---|---|---|---|---|
| $T_{start}$ → | — | — | 0 | 0 |
| | $O_1$ | $O_1$ | 1 | 1 |
| | $O_2$ | $O_2$ | 2 | 2 |
| | $O_3$ | $O_3$ | 3 | 3 |
| | $O_4$ | $O_4$ | 4 | 4 |
| | $O_5$ | $O_5$ | 5 | 5 |
| | ⋮ | ⋮ | ⋮ | ⋮ |
| | $O_n$ | $O_n$ | n | n |
| $T_{end}$ → | — | — | n | O |

*FIG. 3*

APPARATUS, SYSTEM, AND METHOD FOR CLIPPING GRAPHICS PRIMITIVES WITH ACCELERATED CONTEXT SWITCHING

CROSS REFERENCE TO RELATED APPLICATION

This application is a continuation of U.S. application Ser. No. 11/313,085, filed on Dec. 19, 2005, the disclosure of which is hereby incorporated by reference in its entirety.

BRIEF DESCRIPTION OF THE INVENTION

The invention relates generally to graphics processing. More particularly, the invention relates to an apparatus, system, and method for clipping graphics primitives with accelerated context switching.

BACKGROUND OF THE INVENTION

Advanced Graphics Processing Units ("GPUs") sometimes implement techniques for context switching. In general, context switching refers to switching execution among multiple contexts such that those contexts can share a common processing resource. Multiple contexts can be related to distinct operation modes of the same application program or multiple application programs.

In order to accelerate graphics processing, it is desirable to reduce a response time for context switching. As can be appreciated, this response time represents a performance penalty for context switching and is typically dependent upon a pair of factors, namely an amount of time to complete any pending work and an amount of execution state information to be stored and restored. Typically, a larger amount of time to complete any pending work translates into a longer response time, thus resulting in a larger performance penalty. Similarly, a larger amount of execution state information to be stored and restored typically translates into a longer response time and a larger performance penalty. Unfortunately, current techniques for context switching can be deficient from the standpoint of one or both of these factors, particularly with respect to clipping graphics primitives.

One current technique for context switching is a "wait for idle" technique. In accordance with this technique, context switching is typically placed on hold so as to complete any pending work in connection with clipping a graphics primitive. While an amount of execution state information to be stored and restored is thus reduced, completing the pending work often takes an undesirable amount of time. Indeed, in some instances, completing the pending work can take hundreds of clock cycles, particularly when clipping the graphics primitive with respect to multiple clipping planes. Another current technique for context switching is a "halt style" technique. In accordance with this technique, any pending work in connection with clipping a graphics primitive is halted prior to its completion to allow context switching. While an amount of time to complete the pending work is thus reduced, an amount of execution state information to be stored and restored is often undesirably large, particularly given the extensive amount of information that is typically maintained in hardware while clipping the graphics primitive. Indeed, in some instances, storing and restoring the execution state information can take numerous clock cycles.

It is against this background that a need arose to develop the apparatus, system, and method described herein.

SUMMARY OF THE INVENTION

In one aspect, the invention relates to a graphics processing apparatus. In one embodiment, the graphics processing apparatus includes a clipping unit that is configured to produce and issue $n_i$ initial outputs based on execution of a set of clipping operations, wherein $n_i$ represents the number of the initial outputs that are issued by the clipping unit prior to context switching, and the initial outputs partially define a clipped graphics primitive. The graphics processing apparatus also includes a control unit connected to the clipping unit. The control unit is configured to preserve an initial execution state of the clipping unit in response to an initial command for context switching, wherein the initial execution state is preserved based on $n_i$.

In another aspect, the invention relates to a graphics processing method. In one embodiment, the graphics processing method includes producing an initial set of outputs based on clipping of a graphics primitive and issuing the initial set of outputs. The graphics processing method also includes, in response to an initial command for context switching: (1) suspending the clipping of the graphics primitive, and (2) preserving an initial execution state based on an indication that the initial set of outputs has already been issued. The graphics processing method further includes, in response to a subsequent command for context switching: (1) restoring the initial execution state, (2) restarting the clipping of the graphics primitive so as to produce the initial set of outputs and a subsequent set of outputs, and (3) issuing the subsequent set of outputs based on restarting the clipping of the graphics primitive, wherein the issuing the subsequent set of outputs includes referencing the initial execution state so as to issue the subsequent set of outputs without reissuing the initial set of outputs.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which:

FIG. 3 illustrates an example of operation of the clipping module of FIG. 2.

Like reference numerals are used to refer to corresponding components of the drawings.

DETAILED DESCRIPTION

Figure 1:
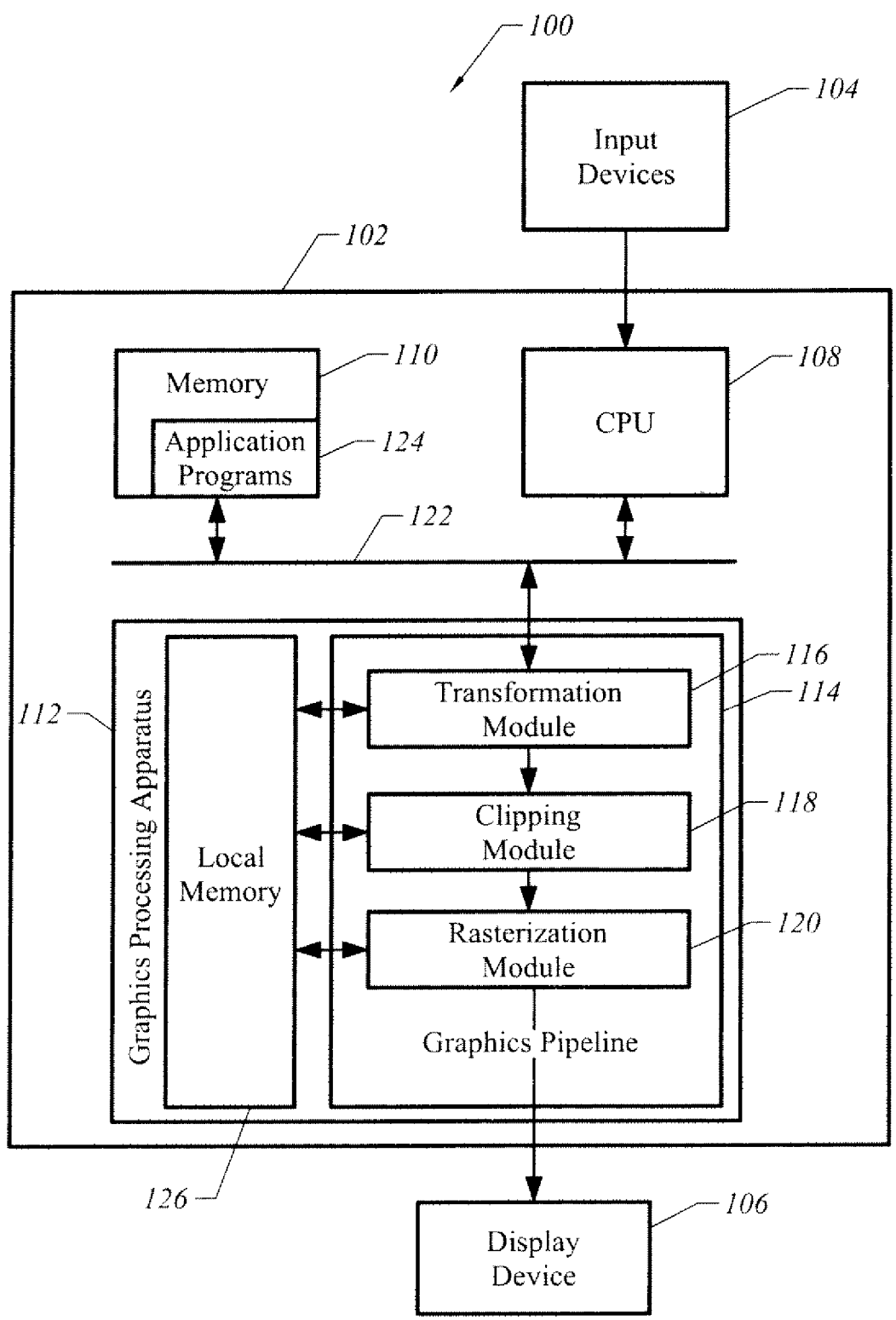
FIG. 1 illustrates a computer system that is implemented in accordance with an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of input devices 104, which can include, for example, a keyboard and a mouse. The computer 102 is also connected to a display device 106, which can be, for example, a television set, a Cathode Ray Tube ("CRT") monitor, or a Liquid Crystal Display ("LCD") monitor.

The computer 102 includes a Central Processing Unit ("CPU") 108, which is connected to a memory 110 over a bus 122. Referring to FIG. 1, the memory 110 stores a set of application programs 124, which can include, for example, a set of graphics programs. The memory 110 can include, for example, a Random Access Memory ("RAM") and a Read Only Memory ("ROM"). As illustrated in FIG. 1, the computer 102 also includes a graphics processing apparatus 112 that is connected to the CPU 108 and the memory 110 over the bus 122. The graphics processing apparatus 112 can be, for example, a GPU.

In the illustrated embodiment, the graphics processing apparatus 112 performs a number of operations when servicing a particular context related to the application programs 124. This context can be related to a particular operational mode of the application programs 124, such as a three-dimensional ("3-D") graphics mode, a two-dimensional ("2-D") graphics mode, or a video mode. Referring to FIG. 1, the graphics processing apparatus 112 includes a graphics pipeline 114, which includes a number of modules that are connected to one another and that form different stages of the graphics pipeline 114. In particular, the graphics pipeline 114 includes a transformation module 116, a clipping module 118, and a rasterization module 120. While three modules are illustrated in FIG. 1, it is contemplated that the graphics pipeline 114 can include more or less modules depending on the particular implementation. It is also contemplated that these modules can be combined, sub-divided, or re-ordered for another implementation. Referring to FIG. 1, the graphics processing apparatus 112 also includes a local memory 126 that is connected to the graphics pipeline 114. As further described below, the local memory 126 stores execution state information in connection with context switching. However, it is also contemplated that the memory 110 can be used to store the execution state information, such that the local memory 126 can be omitted for certain implementations. The local memory 126 can include, for example, a RAM.

During execution of a particular context, the transformation module 116 initially receives a graphics primitive that represent an object to be displayed. Examples of graphics primitives include one-dimensional graphics primitives, such as lines, and two-dimensional graphics primitives, such as polygons. Referring to FIG. 1, the transformation module 116 performs a number of transformation operations on the graphics primitive. For example, coordinate data of vertices defining the graphics primitive can be rotated, scaled, translated, or converted from one coordinate space into another coordinate space. It is also contemplated that color data, specularity data, or texture data of the vertices can be modified, such as in connection with lighting operations. The transformation module 116 then delivers the graphics primitive that has been transformed in such manner to the clipping module 118.

Referring to FIG. 1, the clipping module 118 next clips the graphics primitive with respect to a set of clipping planes to produce a clipped graphics primitive. The clipping module 118 then delivers the clipped graphics primitive to the rasterization module 120. It is also contemplated that multiple clipped graphics primitives can be produced as a result of clipping the graphics primitive. In the illustrated embodiment, the clipping planes define a viewing region, which can be a two-dimensional viewing area or a three-dimensional viewing volume. It is also contemplated that the clipping planes can alternatively, or in conjunction, include a set of model clipping planes, which can be specified by a user to further restrict the viewing region or to remove certain portions of the object from view. It is further contemplated that the clipping planes can alternatively, or in conjunction, include a w=0 plane in homogeneous space. As can be appreciated, the w=0 plane can be positioned at a viewpoint of the viewing region, such that portions of the object that lie on a w<0 side of that plane are behind the viewpoint and are, thus, not visible. The clipping module 118 serves to increase efficiency of the graphics pipeline 114, as further processing on portions of the object that lie outside the viewing region need not be performed. Also, by using the set of model clipping planes, the clipping module 118 allows portions of the object that were previously hidden from view to be visualized. Furthermore, by using the w=0 plane, the clipping module 118 serves to avoid further processing on portions of the object that are behind the viewpoint.

Referring to FIG. 1, the rasterization module 120 next performs a number of interpolation operations on the clipped graphics primitive to produce a set of pixels that represent the object to be displayed. For example, coordinate data of vertices defining the clipped graphics primitive can be interpolated to assign the pixels to represent the object. It is also contemplated that color data, specularity data, or texture data of the vertices can be interpolated in connection with pixel assignment. The rasterization module 120 then delivers the pixels for display using the display device 106.

The foregoing describes operation of the graphics processing apparatus 112 in the absence of context switching. Advantageously, the graphics processing apparatus 112 also operates in accordance with an improved technique for context switching. This improved technique provides the graphics processing apparatus 112 with multi-tasking capabilities by allowing the graphics processing apparatus 112 to efficiently service multiple contexts related to the application programs 124. In particular, when execution switches from a first context to a second context, the graphics processing apparatus 112 preserves an execution state of the first context prior to servicing the second context. The execution state of the first context represents a degree of progress of execution of the first context. Subsequent to servicing the second context, the graphics processing apparatus 112 restores the execution state of the first context so that the execution of the first context can proceed. In connection with context switching, execution state information of the first context is collected from the transformation module 116, the clipping module 118, and the rasterization module 120, and this execution state information is then delivered to the local memory 126 for storage. Subsequent to servicing the second context, this execution state information is retrieved from the local memory 126 and then restored to the transformation module 116, the clipping module 118, and the rasterization module 120. In the illustrated embodiment, context switching is typically initiated by the CPU 108, which issues a context switching command that is delivered to the graphics processing apparatus 112 over the bus 122. However, it is also contemplated that context switching can be initiated by the graphics processing apparatus 112.

With respect to the clipping module 118, context switching is implemented so as to reduce both an amount of time to complete any pending work and an amount of execution state information to be stored and restored. In particular, in response to receiving a context switch command, the clipping module 118 suspends clipping a graphics primitive in accordance with the first context. Advantageously, clipping the graphics primitive is suspended prior to its completion and with little or no delay upon receiving the context switching command. The clipping module 118 then collects execution state information of the first context and delivers this execution state information to the local memory 126 for storage. Advantageously, this execution state information represents a reduced and optimized set of information to preserve an execution state of clipping the graphics primitive and need not include a variety of other information that is maintained in the clipping module 118. In particular, as further described below, this execution state is readily preserved based on how many outputs have already been issued by the clipping module 118 in connection with clipping the graphics primitive. Subsequent to servicing the second context, this execution state is restored to the clipping module 118, which resumes issuing outputs that have not yet been issued in connection with clipping the graphics primitive. By operating in such manner, the clipping module 118 allows context switching to be performed in an accelerated manner so as to reduce a performance penalty for context switching. In addition, such accelerated context switching is achieved with little or no additional cost or complexity as compared with a conventional implementation.

Figure 2:
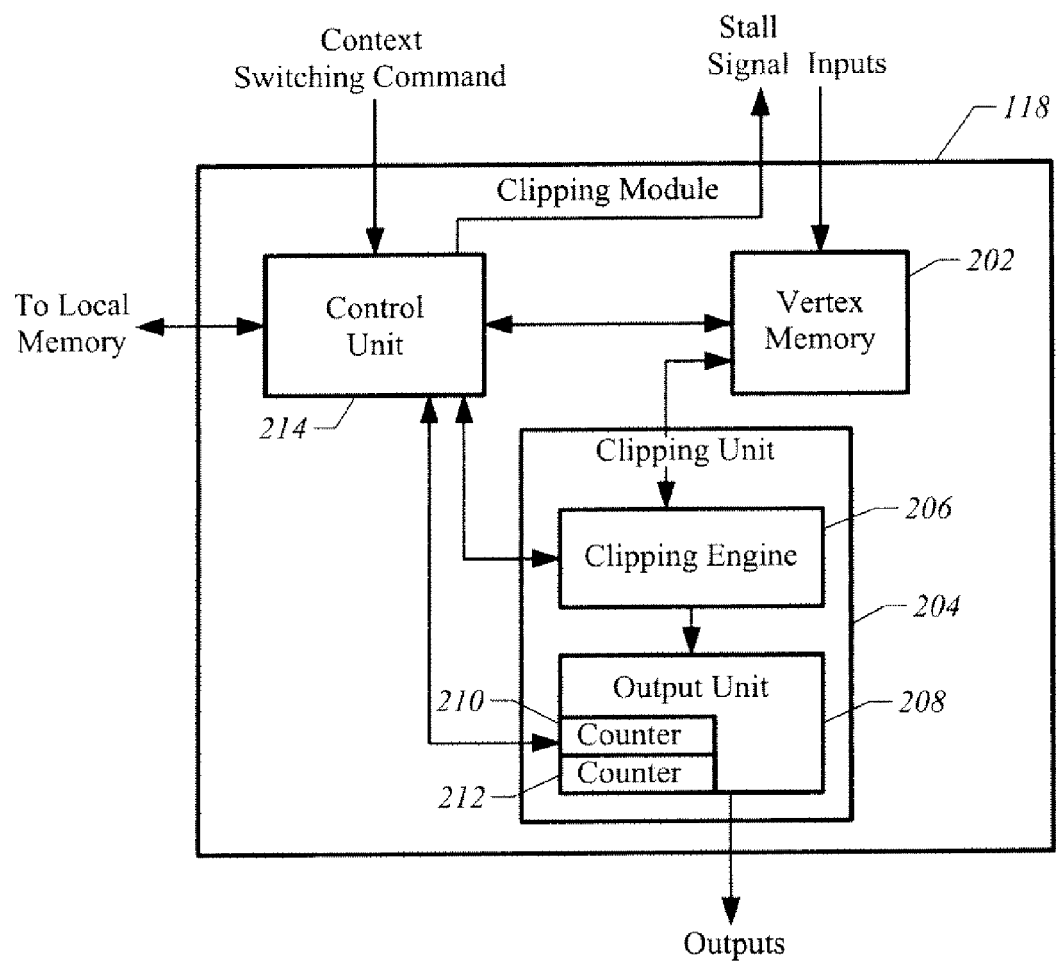
FIG. 2 illustrates a clipping module that is implemented in accordance with an embodiment of the invention.

Attention next turns to FIG. 2, which illustrates the clipping module 118 that is implemented in accordance with an embodiment of the invention. The clipping module 118 includes a vertex memory 202, which receives and stores a set of inputs defining a graphics primitive to be clipped in accordance with a first context. The inputs can include, for example, coordinate data, color data, specularity data, and texture data of vertices defining the graphics primitive. The vertex memory 202 can be implemented as, for example, a RAM that stores the inputs in accordance with an order in which the inputs are received.

As illustrated in FIG. 2, the clipping module 118 also includes a clipping unit 204, which clips the graphics primitive with respect to a set of clipping planes to produce a clipped graphics primitive. Referring to FIG. 2, the clipping unit 204 includes a clipping engine 206, which is connected to the vertex memory 202. The clipping engine 206 accesses the inputs that are stored in the vertex memory 202 and executes a set of clipping operations to produce a set of outputs defining the clipped graphics primitive. The outputs can include, for example, coordinate data, color data, specularity data, and texture data of vertices defining the clipped graphics primitive. In the absence of context switching, the clipping engine 206 typically completes execution of the clipping operations without interruption. On the other hand, in the event of context switching, the clipping engine 206 suspends the execution of the clipping operations prior to completion. Upon resuming the first context, the clipping engine 206 restarts the execution of the clipping operations from the beginning. In the illustrated embodiment, the clipping engine 206 executes the clipping operations in accordance with any suitable clipping technique, such as the Cohen-Sutherland technique, the Liang-Barsky technique, the Sutherland-Hodgeman technique, or the Weiler technique. The clipping engine 206 can be implemented as, for example, a micro-coded engine including a ROM that stores a clipping program for executing the clipping operations.

Referring to FIG. 2, the clipping unit 204 also includes an output unit 208, which is connected to the clipping engine 206. The output unit 208 issues one or more of the outputs that are produced by the clipping engine 206 for the first context. In the absence of context switching, the output unit 208 typically issues all of the outputs that are produced by the clipping engine 206. On the other hand, in the event of context switching, the output unit 208 selectively issues particular ones of the outputs based on whether those outputs have yet to issued for the first context. In such manner, the output unit 208 avoids reissuing remaining ones of the outputs that have already been issued prior to resuming the first context. As illustrated in FIG. 2, the output unit 208 references contents of a pair of counters 210 and 212 to determine which ones of the outputs should be issued for the first context. While the counters 210 and 212 are illustrated as being included in the output unit 208, it is also contemplated that the counters 210 and 212 can be implemented elsewhere.

As illustrated in FIG. 2, the clipping module 118 further includes a control unit 214, which is connected to and coordinates operations that are performed by the vertex memory 202 and the clipping unit 204. In the event of context switching, the control unit 214 preserves an execution state of clipping the graphics primitive in accordance with the first context. In particular, the execution state is preserved simply based on contents of the vertex memory 202 and the counter 212. Upon resuming the first context, the control unit 214 restores the contents of the vertex memory 202 and the counter 212 so that clipping the graphics primitive can proceed. In the illustrated embodiment, the control unit 214 receives context switching commands from the CPU 108 (not illustrated in FIG. 2) and routes execution state information to and from the local memory 126 (not illustrated in FIG. 2). Referring to FIG. 2, the control unit 214 issues a stall signal so as to hold the inputs of the vertex memory 202 prior to completion of clipping the graphics primitive. In such manner, the inputs are not overwritten in the vertex memory 202 by a subsequent set of inputs and remain accessible in the event that clipping the graphics primitive is restarted. The control unit 214 can be implemented in any suitable manner, such as using computer code, hardwired circuitry, or a combination of computer code and hardwired circuitry.

Figure 4:
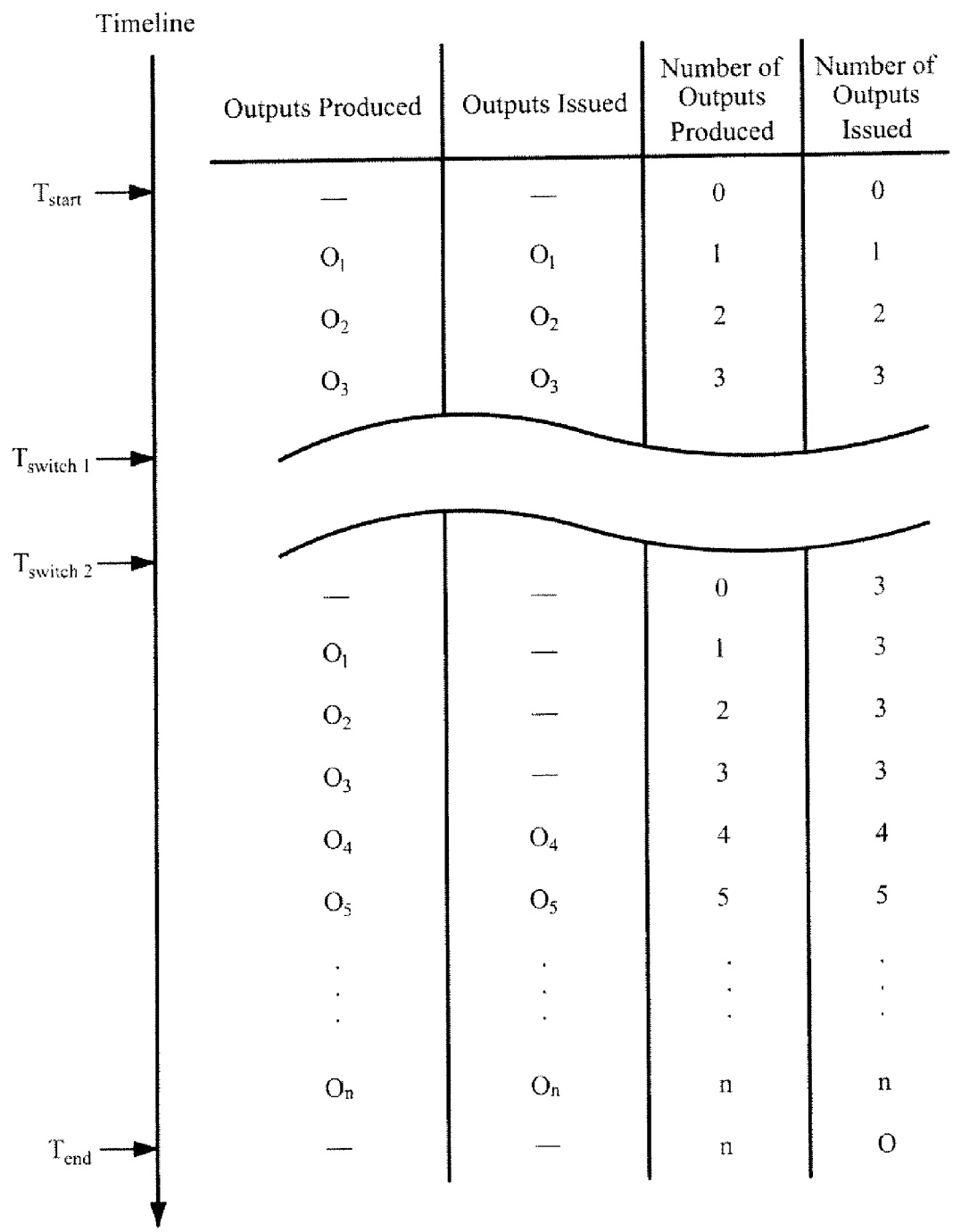
FIG. 4 illustrates another example of operation of the clipping module of FIG. 2.

Advantages and features of the clipping module 118 can be further understood in conjunction with FIG. 3 and FIG. 4, which illustrate examples of the operation of the clipping module 118.

FIG. 3 illustrates an example of the operation of the clipping module 118 in the absence of context switching. In particular, at $T_{start}$, the vertex memory 202 receives and stores a sequence of inputs defining a graphics primitive to be clipped in accordance with a first context. The clipping engine 206 next begins clipping the graphics primitive by accessing the inputs that are stored in the vertex memory 202. In the absence of context switching, the clipping engine 206 completes clipping the graphics primitive without interruption to produce a sequence of outputs $O_1$ through $O_n$. In conjunction, the output unit 208 issues each of the outputs $O_1$ through $O_n$ that are produced by the clipping engine 206. In the illustrated example, the counter 210 tracks a number of outputs that are produced as a result of clipping the graphics primitive, while the counter 212 tracks a number of outputs that are issued as a result of clipping the graphics primitive. In the absence of context switching, the counters 210 and 212 are incremented substantially in unison. To facilitate context switching as further described below, the counter 210 is cleared upon start of clipping the graphics primitive, namely at or around $T_{start}$, while the counter 212 is not cleared until completion of clipping the graphics primitive, namely at or around $T_{end}$.

FIG. 4 illustrates an example of the operation of the clipping module 118 in the event of context switching. In particular, at $T_{start}$, the vertex memory 202 receives and stores a sequence of inputs defining a graphics primitive to be clipped in accordance with a first context. The clipping engine 206 next begins clipping the graphics primitive by accessing the inputs that are stored in the vertex memory 202. Prior to context switching, the clipping engine 206 partially completes clipping the graphics primitive to produce an initial sequence of outputs $O_1$ through $O_3$. In conjunction, the output unit 208 issues each of the outputs $O_1$ through $O_3$ that are produced by the clipping engine 206. As in the previous example, the counter 210 tracks a number of outputs that are produced as a result of clipping the graphics primitive, while the counter 212 tracks a number of outputs that are issued as a result of clipping the graphics primitive. Prior to context switching, the counters 210 and 212 are incremented substantially in unison.

Next, at $T_{switch1}$, the control unit 214 receives an initial context switching command and directs the clipping unit 204 to switch to a second context. In response, the clipping engine 206 suspends clipping the graphics primitive in accordance with the first context. In conjunction, the control unit 214 collects contents of the vertex memory 202 and the counter 212 so as to preserve an execution state of clipping the graphics primitive. In particular, the control unit 214 retrieves a content of the counter 212 so as to preserve an indication that three outputs have already been issued as a result of clipping the graphics primitive. Upon switching to the second context, the clipping unit 204 can either service the second context or remain idle.

Referring to FIG. 4, at $T_{switch2}$, the control unit 214 receives a subsequent context switching command and directs the clipping unit 204 to switch back to the first context. The control unit 214 also restores the contents of the vertex memory 202 and the counter 212 so as to restore the execution state of clipping the graphics primitive. In response, the clipping engine 206 restarts clipping the graphics primitive from the beginning so as to again produce the initial sequence of outputs $O_1$ through $O_3$. Restarting clipping the graphics primitive typically incurs little or no performance penalty, since an amount of time to produce the outputs $O_1$ through $O_3$ is typically less than or comparable to an amount of time to restore other components of the graphics pipeline 114. Thus, restarting clipping the graphics primitive can overlap the amount of time to restore other components of the graphics pipeline 114. In the absence of further context switching, the clipping engine 206 completes clipping the graphics primitive without further interruption to produce a remaining sequence of outputs $O_4$ through $O_n$.

In conjunction, the output unit 208 selectively issues the outputs $O_4$ through $O_n$ without reissuing the outputs $O_1$ through $O_3$. The output unit 208 can either discard the outputs $O_1$ through $O_3$ or designate these outputs as being invalid. In the illustrated example, the output unit 208 references contents of the counters 210 and 212 to determine which outputs should be issued. In particular, the counter 210 is cleared upon restart of clipping the graphics primitive, namely at or around $T_{switch2}$, and again tracks a number of outputs that are produced as a result of clipping the graphics primitive. However, the counter 212 is not initially incremented so as to preserve the indication that three outputs have already been issued prior to resuming the first context. Thus, by comparing the contents of the counters 210 and 212, the output unit 208 will not issue any output until the output $O_4$ is produced, upon which the counters 210 and 212 are again incremented substantially in unison. In the absence of further context switching, the counter 212 is then cleared upon completion of clipping the graphics primitive, namely at or around $T_{end}$. Alternatively, the clipping module 118 can operate in a similar manner as described above in the event of further context switching.

As can be appreciated at this point, embodiments of the invention allow context switching to be performed in an accelerated manner and with little or no additional cost or complexity as compared with a conventional implementation. In particular, context switching is accelerated by reducing both an amount of time to complete any pending work and an amount of execution state information to be stored and restored. For example, prior to context switching, a clipping program can be executed in accordance with an initial context to produce an initial sequence of outputs. In the event of context switching, execution of the clipping program can be suspended prior to its completion and with little or no delay. A reduced and optimized set of information can be collected so as to preserve an initial execution state of the clipping program. In particular, the initial execution state can be preserved simply based on contents of a vertex memory and a counter, without requiring other contents of an internal datapath pipeline or scratch registers to be stored and restored. Upon resuming the initial context, the initial execution state can be restored, and the clipping program can be restarted from the beginning. By referencing the initial execution state, a remaining sequence of outputs can be issued without reissuing the initial sequence of outputs.

It should be appreciated that the specific embodiments of the invention described above are provided by way of example, and various other embodiments are encompassed by the invention. For example, while some embodiments have been described with reference to clipping graphics primitives, it is contemplated that the improved technique for context switching can be similarly implemented for various applications, such as those in which a relatively large number of outputs are produced or those in which completing any pending work can take a relatively long time.

Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital. Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Some embodiments of the invention can be implemented using computer code in place of, or in combination with, hardwired circuitry. For example, with reference to FIG. 2, various components of the clipping module 118 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
a graphics pipeline including
   a first pipeline stage; and
   a second pipeline stage downstream of the first pipeline stage,
   wherein the first pipeline stage includes
      a clipping unit configured to produce and issue $n_i$ initial outputs based on execution of a set of clipping operations, wherein $n_i$ represents the number of the initial outputs that are issued by the first pipeline stage and delivered to the second pipeline stage prior context switching, and the initial outputs partially define a clipped graphics primitive; and
      a control unit connected to the clipping unit, the control unit configured to preserve an initial execution state of the clipping unit in response to an initial command for context switching,
   wherein the first pipeline stage further includes a counter to track $n_i$, and
   wherein the initial execution state is preserved based on $n_i$.

2. The graphics processing apparatus of claim 1, wherein the initial outputs include at least one of coordinate data, color data, specularity data, and texture data of vertices defining the clipped graphics primitive.

3. The graphics processing apparatus of claim 1, wherein the clipping unit is configured to suspend the execution of the set of clipping operations in response to the initial command.

4. The graphics processing apparatus of claim 3, wherein the execution of the set of clipping operations is suspended prior to completion so as to accelerate context switching.

5. The graphics processing apparatus of claim 1, wherein the control unit is configured to collect execution state information of the clipping unit and to deliver the execution state information to a memory, and the execution state information includes an indication of $n_i$ as tracked by the counter.

6. The graphics processing apparatus of claim 5, wherein an amount of the execution state information is reduced so as to accelerate context switching.

7. The graphics processing apparatus of claim 1, wherein the control unit is configured to restore the initial execution state to the clipping unit in response to a subsequent command for context switching.

8. The graphics processing apparatus of claim 7, wherein the clipping unit is configured to restart the execution of the set of clipping operations in response to the subsequent command so as to produce the initial outputs and subsequent outputs.

9. The graphics processing apparatus of claim 8, wherein the clipping unit is configured to issue the subsequent outputs based on restarting the execution of the set of clipping operations, and the clipping unit is configured to reference the counter so as to issue the subsequent outputs without reissuing the initial outputs.

10. The graphics processing apparatus of claim 8, wherein the initial outputs and the subsequent outputs fully define the clipped graphics primitive.

11. A graphics processing method, comprising:
producing an initial set of outputs based on clipping of a graphics primitive;
issuing the initial set of outputs;
in response to an initial command for context switching,
   suspending the clipping of the graphics primitive, and
   preserving an initial execution state by storing an indication that the initial set of outputs has already been issued; and
in response to a subsequent command for context switching,
   restoring the initial execution state,
   restarting the clipping of the graphics primitive so as to produce the initial set of outputs and a subsequent set of outputs, and
   issuing the subsequent set of outputs based on restarting the clipping of the graphics primitive, wherein the issuing the subsequent set of outputs includes referencing the initial execution state so as to issue the subsequent set of outputs without reissuing the initial set of Outputs.

12. The graphics processing method of claim 11, wherein the clipping of the graphics primitive is suspended prior to completion.

13. The graphics processing method of claim 11, wherein the initial set of outputs corresponds to a subset of coordinate data, color data, specularity data, and texture data defining a clipped graphics primitive.

14. The graphics processing method of claim 13, wherein the subsequent set of outputs corresponds to a remaining subset of the coordinate data, the color data, the specularity data, and the texture data defining the clipped graphics primitive.

15. A graphics processing apparatus, comprising:
a transformation module configured to perform a set of transformation operations on a graphics primitive to produce a transformed graphics primitive;
a clipping module connected to the transformation module and configured to perform a set of clipping operations on the transformed graphics primitive to produce a clipped graphics primitive; and
a rasterization module connected to the clipping module and configured to perform a set of interpolation operations on the clipped graphics primitive to produce a set of pixels for display,
wherein the clipping module is configured to deliver an initial set of outputs to the rasterization module, the initial set of outputs partially defining the clipped graphics primitive, and
wherein the graphics processing apparatus includes a counter to track a number of the initial set of outputs that are delivered to the rasterization module, the graphics processing apparatus is configured to preserve an execution state of the clipping module in response to an initial command for context switching, the execution state being preserved based on the number of the initial set of outputs as tracked by the counter.

16. The graphics processing apparatus of claim 15, wherein the clipping module is configured to suspend execution of the set of clipping operations in response to the initial command.

17. The graphics processing apparatus of claim 16, wherein the graphics processing apparatus is configured to restore the execution state of the clipping module in response to a subsequent command for context switching.

18. The graphics processing apparatus of claim 17, wherein the clipping module is configured to restart the execution of the set of clipping operations in response to the subsequent command.

19. The graphics processing apparatus of claim 18, wherein the clipping module is configured to deliver a subsequent set of outputs to the rasterization module, and the clipping module is configured to reference the counter so as to deliver the subsequent set of outputs without redelivering the initial set of outputs.

20. The graphics processing apparatus of claim 19, wherein the initial set of outputs and the subsequent set of outputs fully define the clipped graphics primitive.

* * * * *